United States Patent
Kim et al.

(10) Patent No.: US 8,731,032 B2
(45) Date of Patent: May 20, 2014

(54) COMMUNICATION APPARATUS FOR CONTINUOUS PHASE MODULATION SIGNAL

(75) Inventors: Pan-Soo Kim, Daejeon-si (KR); Yong-Ho Lee, Ulsan-si (KR); Deock-Gil Oh, Daejeon-si (KR); Xavier Giraud, Versailles (FR)

(73) Assignee: Electronics and Telecommunications Research Institute, Daejeon (KR)

( * ) Notice: Subject to any disclaimer, the term of this patent is extended or adjusted under 35 U.S.C. 154(b) by 248 days.

(21) Appl. No.: 13/270,763

(22) Filed: Oct. 11, 2011

(65) Prior Publication Data
US 2012/0087403 A1    Apr. 12, 2012

(30) Foreign Application Priority Data

Oct. 12, 2010 (KR) .................. 10-2010-0099489
Sep. 27, 2011 (KR) .................. 10-2011-0097232

(51) Int. Cl.
*H04B 1/38* (2006.01)
*H03D 3/00* (2006.01)
*G01S 7/40* (2006.01)

(52) U.S. Cl.
USPC ..................... 375/222; 375/334; 342/174

(58) Field of Classification Search
USPC .................. 375/222, 334; 342/174
See application file for complete search history.

(56) References Cited

U.S. PATENT DOCUMENTS

| | | | | |
|---|---|---|---|---|
| 5,633,893 A | | 5/1997 | Lampe et al. | |
| 5,900,570 A | * | 5/1999 | Rossum .................. | 84/653 |
| 5,943,370 A | * | 8/1999 | Smith ..................... | 375/334 |
| 5,974,091 A | * | 10/1999 | Huff ....................... | 375/265 |
| 5,995,539 A | * | 11/1999 | Miller .................... | 375/222 |
| 6,085,094 A | * | 7/2000 | Vasudevan et al. ..... | 455/447 |
| 6,968,021 B1 | * | 11/2005 | White et al. ............ | 375/340 |
| 2002/0097180 A1 | * | 7/2002 | Geisheimer et al. .... | 342/127 |
| 2003/0042974 A1 | * | 3/2003 | Patire et al. ............ | 329/300 |
| 2004/0196177 A1 | * | 10/2004 | Billington et al. ...... | 342/174 |
| 2010/0034318 A1 | | 2/2010 | Lui et al. | |

FOREIGN PATENT DOCUMENTS

KR    1996-7006733    12/1996

OTHER PUBLICATIONS

Bixio Rmioldi, "A Decomposition Approach to CMP," *IEEE Transactions on Information Theory*, vol. 34, No. 2, Mar. 1988.

* cited by examiner

*Primary Examiner* — Chieh M Fan
*Assistant Examiner* — Sarah Hassan
(74) *Attorney, Agent, or Firm* — Staas & Halsey LLP

(57) ABSTRACT

A communication apparatus for a continuous phase modulation signal. The communication apparatus includes a first processing unit configured to generate first information of the continuous phase modulation signal using first symbol data; a symbol converting unit configured to convert the first symbol data into second symbol data or convert the second symbol data into the first symbol data; a symbol storage unit configured to store the second symbol data; a second processing unit configured to second information of the continuous phase modulation signal using the second symbol data stored in the symbol storage unit; a third processing unit configured to generate third information of the continuous phase modulation signal using a modulo operation of an integer related to a modulation index; and an output unit configured to add an output from the third processing unit and an output from the first processing unit and generate the continuous phase modulation signal.

11 Claims, 7 Drawing Sheets

COMMUNICATION APPARATUS FOR CONTINUOUS PHASE MODULATION SIGNAL

CROSS-REFERENCE TO RELATED APPLICATION

This application claims the benefit under 35 U.S.C. §119(a) of Korean Patent Application Nos. 10-2010-0099489, filed on Oct. 12, 2010, and 10-2011-0097232, filed on Sep. 27, 2011, the entire disclosures of which are incorporated herein by references for all purposes.

BACKGROUND

1. Field

The following description relates to a transmission/reception technology for a continuous phase modulation scheme that is unaffected by nonlinear channel distortion of a terminal amplifier (solid state power amplifier (SSPA)) in a satellite communication system.

2. Description of the Related Art

Satellite communication system is generally defined as a power limited system. Due to a long propagation distance between the ground and a satellite transponder, satellite communication system experiences severe attenuation of signal power, and particularly, even worse signal attenuation by heavy rain since the system uses high frequency band like (Ku/Ka band). Thus, in amplifying a signal, it may preferable to operate an amplifier at a maximum efficiency point, but in practice the amplifier is operated through several back-off attempts at the 1-dB compression point of nonlinear region in order to avoid nonlinear distortion. This causes a problem of reduction in power efficiency. Meanwhile, a continuous phase modulation scheme is not affected by nonlinear distortion, and thus is widely used by the satellite communication system.

However, the continuous phase modulation scheme requires the design of a complicated receiver, and the performance is largely influenced by a channel code to be combined. Therefore, there is a need for a communication apparatus having a design that is not affected by a channel code and being capable of operating under severe channel attenuation conditions.

SUMMARY

The following description relates to a transmission/reception apparatus for a robust continuous phase modulation signal, which is applicable to various channel codes, reduces the overall system complexity or the amount of computation, and is not affected by a severe channel error.

In one general aspect, there is provided a communication apparatus for a continuous phase modulation signal, including: a first processing unit configured to generate first information of the continuous phase modulation signal using first symbol data; a symbol converting unit configured to convert the first symbol data into second symbol data or convert the second symbol data into the first symbol data; a symbol storage unit configured to store the second symbol data; a second processing unit configured to second information of the continuous phase modulation signal using the second symbol data stored in the symbol storage unit; a third processing unit configured to generate third information of the continuous phase modulation signal using a modulo operation of an integer related to a modulation index; and an output unit configured to add an output from the third processing unit and an output from the first processing unit and generate the continuous phase modulation signal.

In another general aspect, there is provided a communication apparatus for a continuous phase modulation signal, including: a sample storage unit configured to store a received data sample; a first synchronizing unit configured to generate two-dimensional cell data by means of correlation and fast Fourier transform (FFT) with respect to the data sample stored in the sample stored unit and perform burst start point detection, symbol timing synchronization, and carrier frequency synchronization using the generated two-dimensional cell data; and a second synchronizing unit configured to perform symbol detection and phase synchronization using Bahl-Cocke-Jelinek-Raviv (BCJR) algorithm.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
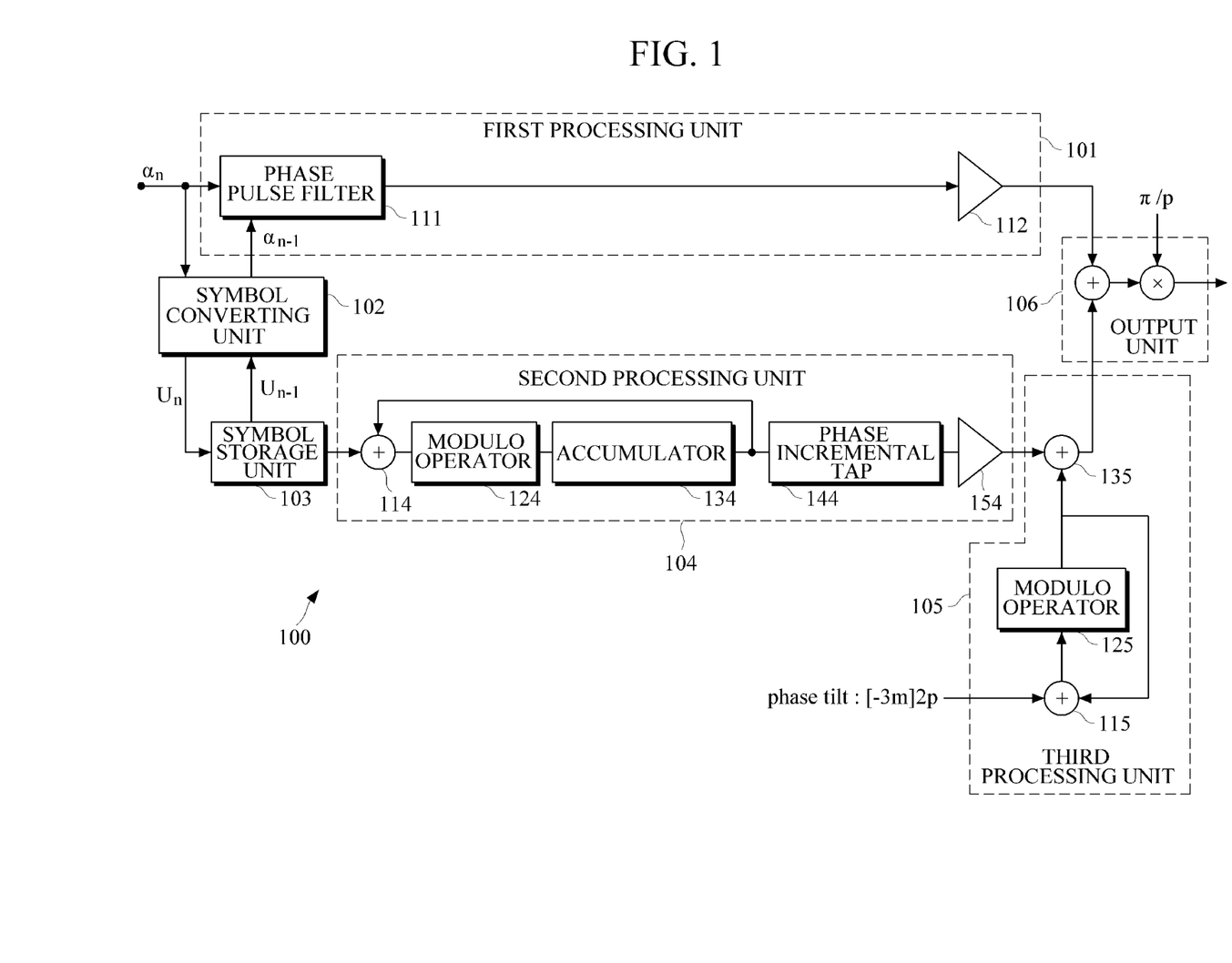
FIG. 1 is a diagram illustrating a communication apparatus for a continuous phase modulation signal according to an exemplary embodiment of the present invention.

FIG. 1 is a diagram illustrating a communication apparatus for a continuous phase modulation signal according to an exemplary embodiment of the present invention.

Referring to FIG. 1, communication apparatus 100 may be applied to a transmission part or a modulation part of a communication system.

Prior to describing a configuration of the communication apparatus 100 according to the exemplary embodiment of the present invention, a continuous phase modulation (CPM) signal will be briefly described. A complex baseband of a CPM signal may be represented by Equation 1 as below.

$$s(t, \alpha) = \sqrt{\frac{E}{T}} \exp[j\Psi(t, \alpha)] \quad (1)$$

where, E represents energy of a signal, T represents a symbol duration, and $\Psi(t, \alpha)$ represents a time-variant phase of the signal. That is, the CPM signal is a signal having a constant envelope, and all information of the signal is included in the phase. The phase may be represented by Equation 2 as below.

$$\Psi(t, \alpha) = 2\pi h \sum_{k=-\infty}^{n} \alpha_k q(t - kT), \quad (2)$$

where α represents symbol data, and q(t) represents a phase pulse. The phase pulse q(t) may be represented as a time integral of a frequency pulse f(t) having a total area of 0.5. In addition, h denotes a modulation index, which is represented as an irreducible rational number. According to the exemplary embodiment, the modulation index h may be m/p. m and p may be arbitrary integers chosen by a user according to applications of the communication apparatus in accordance with the exemplary embodiment. For example, the symbol data a may be defined by Equation 3 as below.

$$\alpha = (\alpha_0, \alpha_1, \ldots)$$

$$\alpha_i \in \{\pm 1, \pm 3, \ldots, \pm M-1\}, M = \text{even}, i \geq 0$$

$$\alpha_i \in \{0, \pm 2, \ldots, \pm M-1\}, M = \text{odd}, i \geq 0 \quad (3)$$

In Equation 3, if M is 4, the symbol data α may be {−1, −3, 1, 3}.

In addition, Equation 2 may be represented by Equation 4 as below.

$$\Psi(t, \alpha) = \theta(t, \alpha_n) + \theta_{n-L} + \phi_n \quad (4)$$

According to the exemplary embodiment, in Equation 4, the first term is referred to as a correlative state of a CPM signal, the second term is referred to as a phase state of the CPM signal, and the third term is referred to as a phase tilt or phase offset of the CPM signal.

In FIG. 1, the communication apparatus 100 may receive the symbol data α, and output phase information $\Psi(t, \alpha)$ of the CPM signal. The communication apparatus 100 may include a first processing unit 101, a symbol converting unit 102, a symbol storage unit 103, a second processing unit 104, a third processing unit 105, and an output unit 106.

The first processing unit 101 generates first information of the CPM signal using first symbol data. The first information of the CPM signal may be information corresponding to a correlative sate of the CPM signal. For example, the first information of the CPM signal may correspond to the first term of Equation 4. The first term of Equation 4 may be represented by Equation 5 as below.

$$\theta(t, \alpha_n) = 2\pi h \sum_{k=n-L+1}^{n} \alpha_k q(t - kT) \quad (5)$$

The first processing unit 101 may calculate $$\sum_{k=n-L+1}^{n} \alpha_k q(t - kT)$$

of Equation 5. For example, the first processing unit 101 may calculate the first information of the CPM signal using current symbol data $\alpha_n$ and previous symbol data $\alpha_{n-1}$. In this regard, the first processing unit 101 may include a phase pulse filter 111 and an amplifier 112, wherein the phase pulse receives the current symbol data $\alpha_n$ and the previous symbol data $\alpha_{n-1}$ and carry out convolution of each of the received symbol data with a phase pulse and the amplifier 112 amplifies an output from the phase pulse filter 111.

The symbol converting unit 102 converts the symbol data $\alpha_n$ into symbol data $U_n$. In addition, the symbol converting unit 102 may convert the symbol data $U_n$ into the symbol data $\alpha_n$. For example, the symbol converting unit 102 may convert symbol data according to Equation 6 as below.

$$U_k = (\alpha_k + m - 1)/2$$

$$\alpha_k = 2U_k - (m-1) \quad (6),$$

where symbol data U may be unsigned integer type data.

The symbol storage unit 103 may store the symbol data $U_n$. A length of the symbol storage unit 103 is denoted by L. The symbol storage unit 103 may store the current symbol data $U_n$ and past symbol data $U_{n-1}, U_{n-2}, \ldots$, and the like. The number of stored symbol data depends on the length L of the symbol storage unit 103.

The second processing unit 104 generates second information of the CPM signal using the previous symbol data $U_{n-1}, U_{n-2}, \ldots$ stored in the symbol storage unit 103. The second information of the CPM signal may be information corresponding to a phase state of the CPM signal. For example, the second information of the CPM signal may correspond to the second term of Equation 4. The second term of the Equation 4 may be represented by Equation 7 as below.

$$\theta_{n-L} = 2\pi h \sum_{k=-\infty}^{n-L} U_k \quad (7)$$

From Equation 7, it is appreciated that the second processing unit 104 generates the second information using pieces of symbol data stored in the symbol storage unit 103 other than the latest L pieces of symbol data. To this end, the second processing unit 104 may include an adder 114, a modulo operator 124, an accumulator 134, a phase incremental tap 144, and an amplifier 154. The modulo operator 124 may perform a modular-P operation. The phase incremental tap 144 may be $\{0, [m]_p, \ldots, [2m]_p, \ldots, [(p-1)m]_p\}$. For example, when a modulation index h is given as m/p=1/4, the phase incremental tap 144 may multiply an output from the accumulator 134 by 0, 1, 2, 3, 0, 1, 2, 3 . . . sequentially.

The third processing unit 105 may generate third information of the CPM signal using a modulo operation of an integer related to the modulation index, and add the generated third information and the second information that is an output from the second processing unit 104. The third information of the CMP signal may be information corresponding to a phase tilt or a phase offset of the CPM signal. For example, the third information of the CPM signal may correspond to the third term of Equation 4. The third term of Equation 4 may be represented by Equation 8 as below.

$$\phi = -\sum_{k=-\infty}^{n-L} \pi h(m-1) \quad (8)$$

$$\phi_n = \phi_{n-1} - \pi h(m-1)$$

In one example, the third processing unit 105 may include a first adder 115, a modulo operator 125, and a second adder 135. The first adder 115 adds a phase tilt related to the modulation index and an output of the modulo operator 125. The modulo operator 125 may perform a modulo-2p operation. The second adder 135 may add the output from the second processing unit 104 and the output from the modulo operator 125.

The output unit 106 adds the output from the first processing unit 101 and the output from the third processing unit 105 and outputs a CPM signal represented as Equation 4 or phase information of a CPM signal.

As such, the communication apparatus 100 according to the exemplary embodiment may be divided into a non-integer branch line (that is, an upper line including the first processing unit 101) which is related to a correlative state and a unsigned-integer branch line (that is, a lower line including the second processing unit 104 and the third processing unit 105) which is related to a phase state. An operation related to a phase tilt or a phase offset is performed in the unsigned-integer branch line, thereby increasing the overall operation efficiency and simplifying the system configuration.

Figure 2:
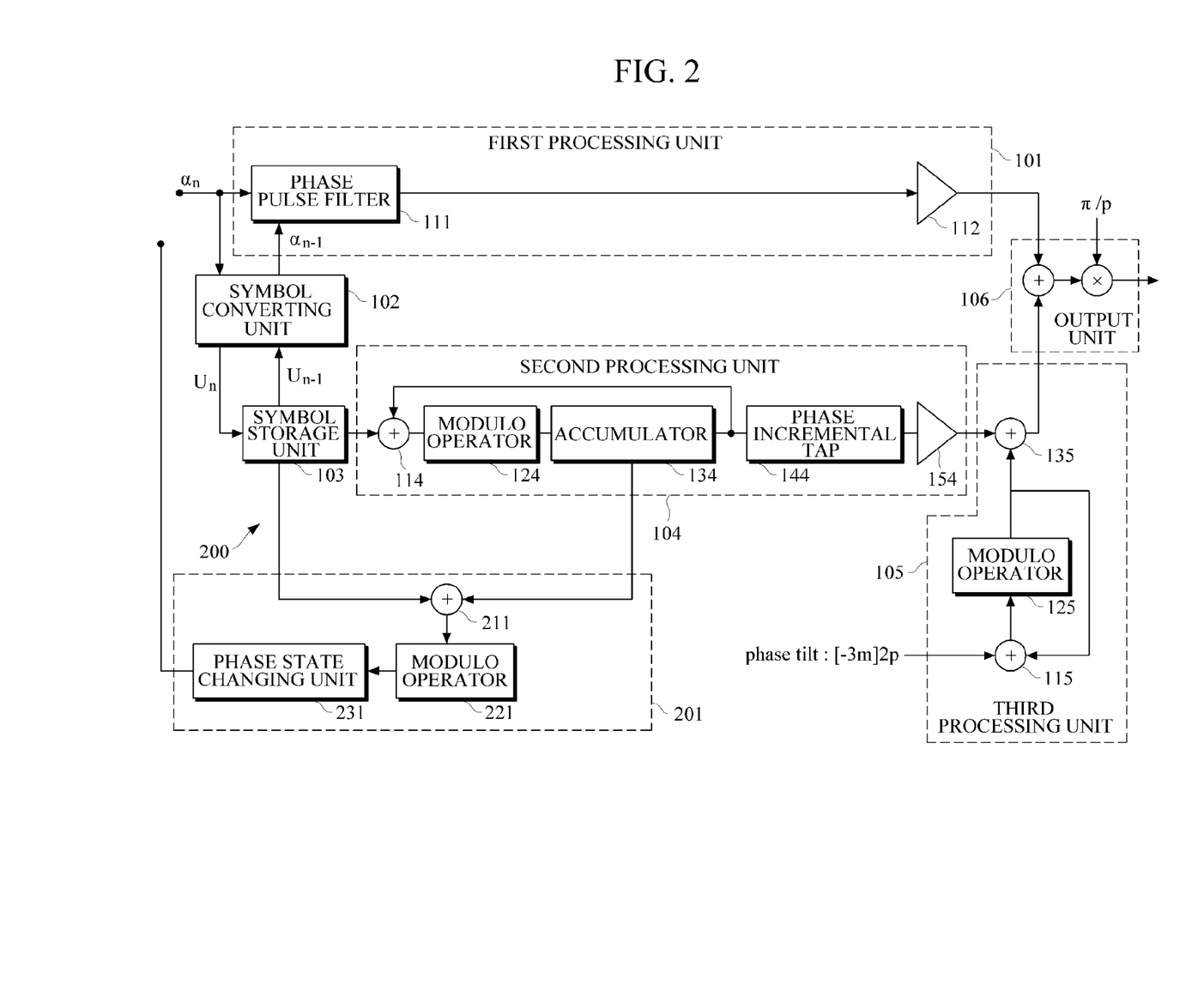
FIG. 2 is a diagram illustrating a communication apparatus for a continuous phase modulation signal according to another exemplary embodiment of the present invention.

FIG. 2 is a diagram illustrating a communication apparatus for a continuous phase modulation signal according to another exemplary embodiment of the present invention.

Referring to FIG. 2, communication apparatus 200 may further include a trellis termination unit 201 in addition to the configuration of the communication apparatus 100 illustrated in FIG. 1.

The trellis termination unit 201 may generate a trellis termination symbol to reset a symbol storage unit 103. Referring to FIG. 2, it is appreciated that a final CPM signal is represented by input symbol data $\alpha_n$ and a trellis that has a finite number of states. The trellis termination symbol may reset a trellis state in order to generate a pilot symbol such as new known data instead of information data. For example, according to the exemplary embodiment, a transmission burst may include a preamble section, a midamble section, and a wasted section in addition to an actual user field. The trellis termination unit 201 may insert a predefined trellis termination symbol into the wasted section to return a state of data to the original state so as to generate a new pilot symbol after the end of the actual user field.

The trellis termination unit 201 may include an adder 211, a modulo operator 221, and a phase state changing unit 231. The adder 211 may add an output from the symbol storage unit 103 and an output from the accumulator 134 of the second processing unit 104 to output a predetermined value V. The modulo operator 221 may perform a (p−V) % p modulo operation. In this case, p is an arbitrary integer related to the modulation index, and V denotes the output from the accumulator 134. The phase state changing unit 231 may change a phase of the output from the modulo operator 221 so as to reset a phase state of a symbol to an original state.

Figure 3:
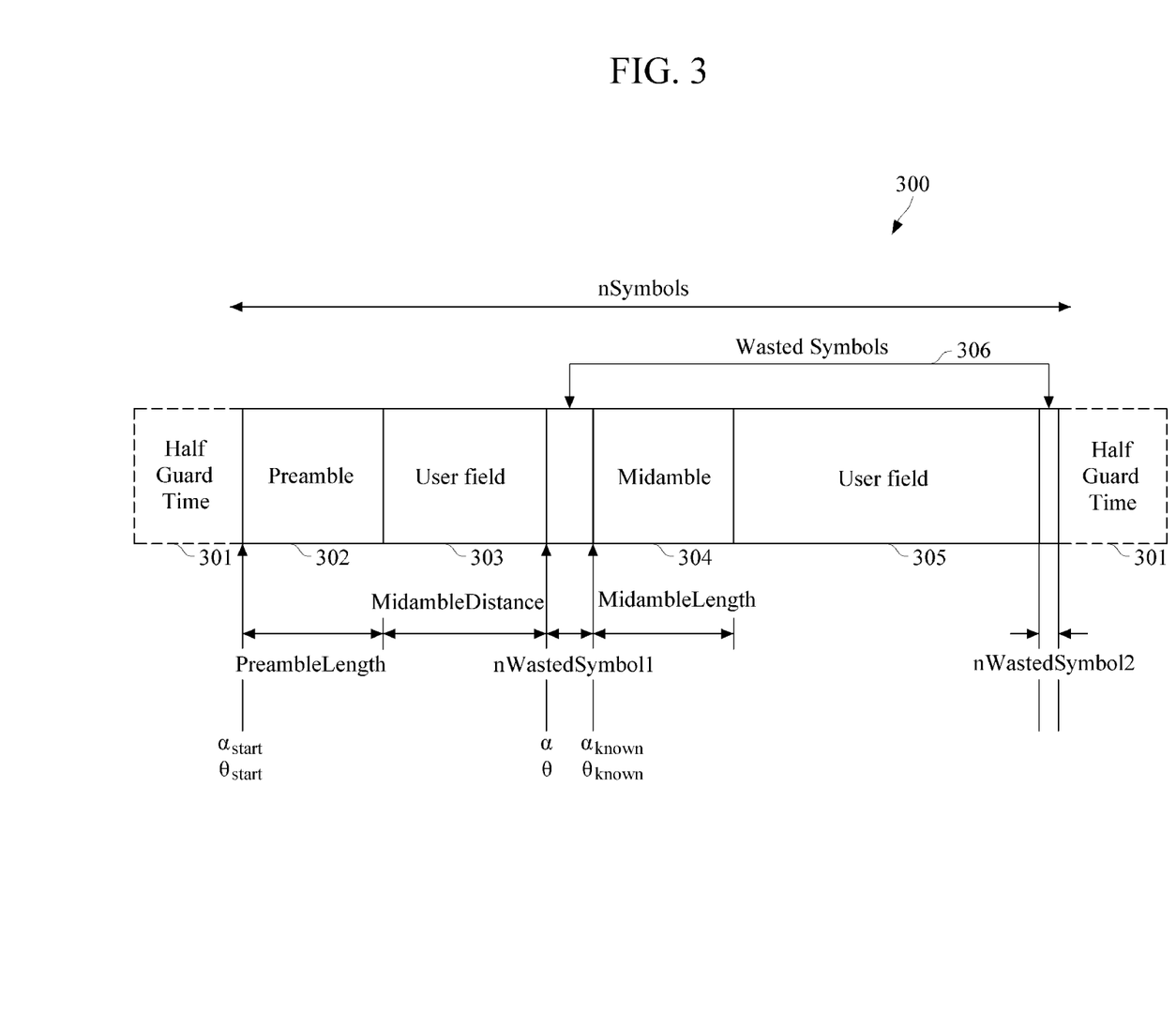
FIG. 3 is a diagram illustrating a structure of a transmission burst according to an exemplary embodiment of the present invention.

FIG. 3 is a diagram illustrating a structure of a transmission burst according to an exemplary embodiment of the present invention.

Referring to FIG. 3, a half guard time 301 is allocated to both the beginning and the end of the transmission burst 300. The transmission burst 300 may include a preamble symbol 302, a first data symbol 303, a midamble symbol 304, and a second data symbol 305. A predefined wasted symbol 306 may be inserted at the end of each of the first data symbol 303 and the second data symbol 305. To generate a new pilot symbol, a state of data is required to be reset to the original state, and the wasted symbol 306 may correspond to the trellis termination symbol as described in FIG. 2.

Figure 4:
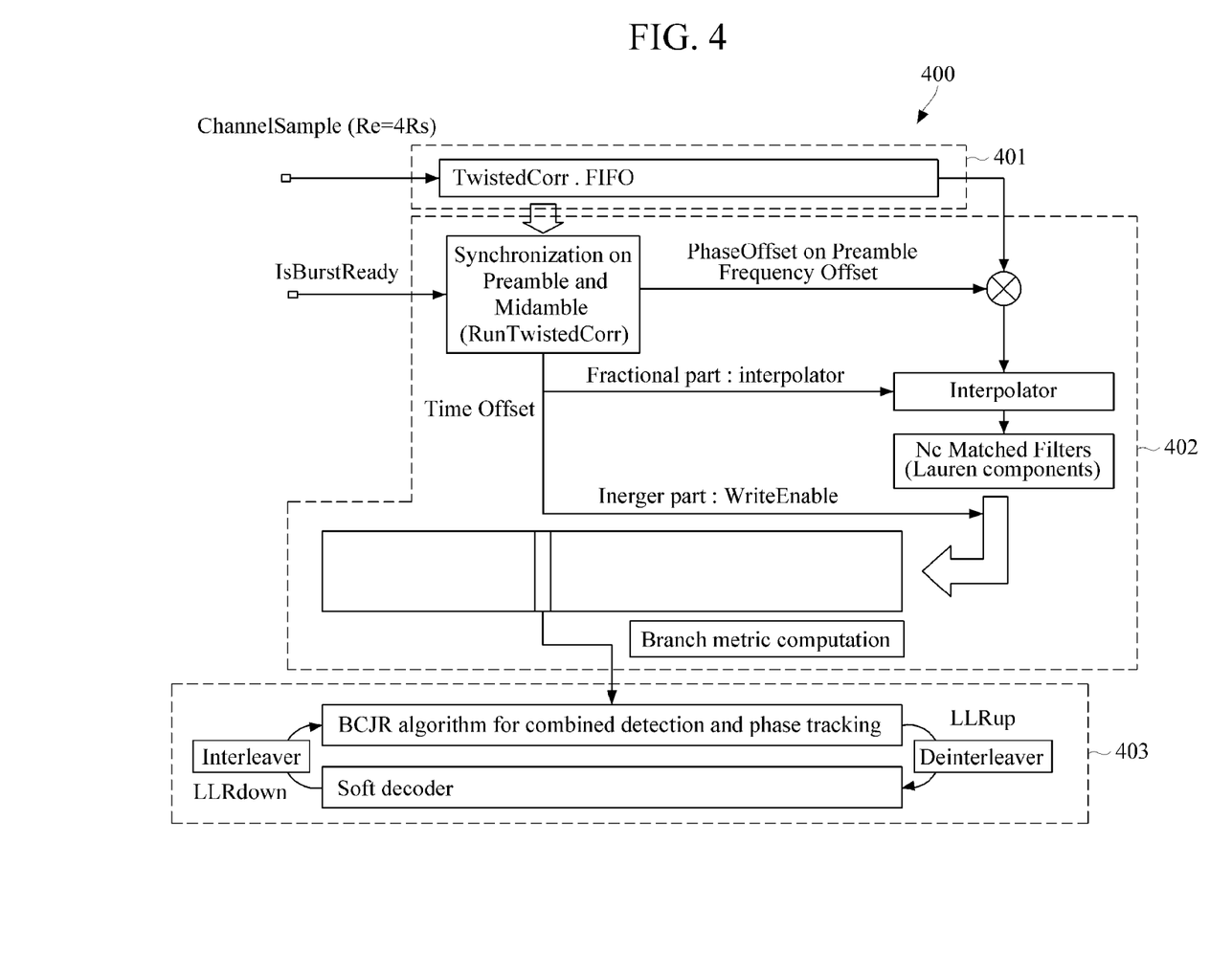
FIG. 4 is a diagram illustrating a communication apparatus for a continuous phase modulation signal according to another exemplary embodiment of the present invention.
Figure 5:
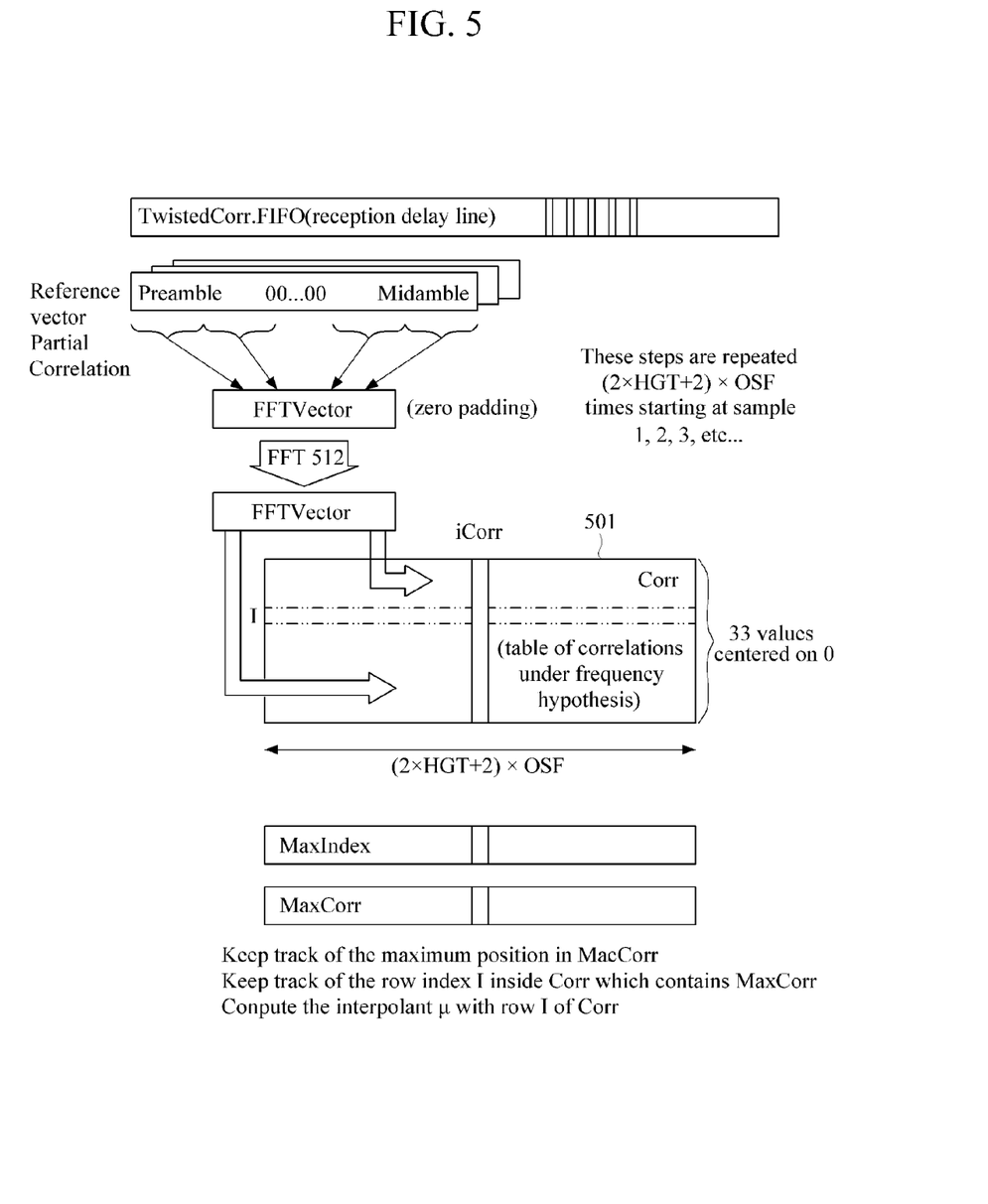
FIG. 5 is a diagram illustrating synchronization process according to an exemplary embodiment of the present invention.
Figure 6:
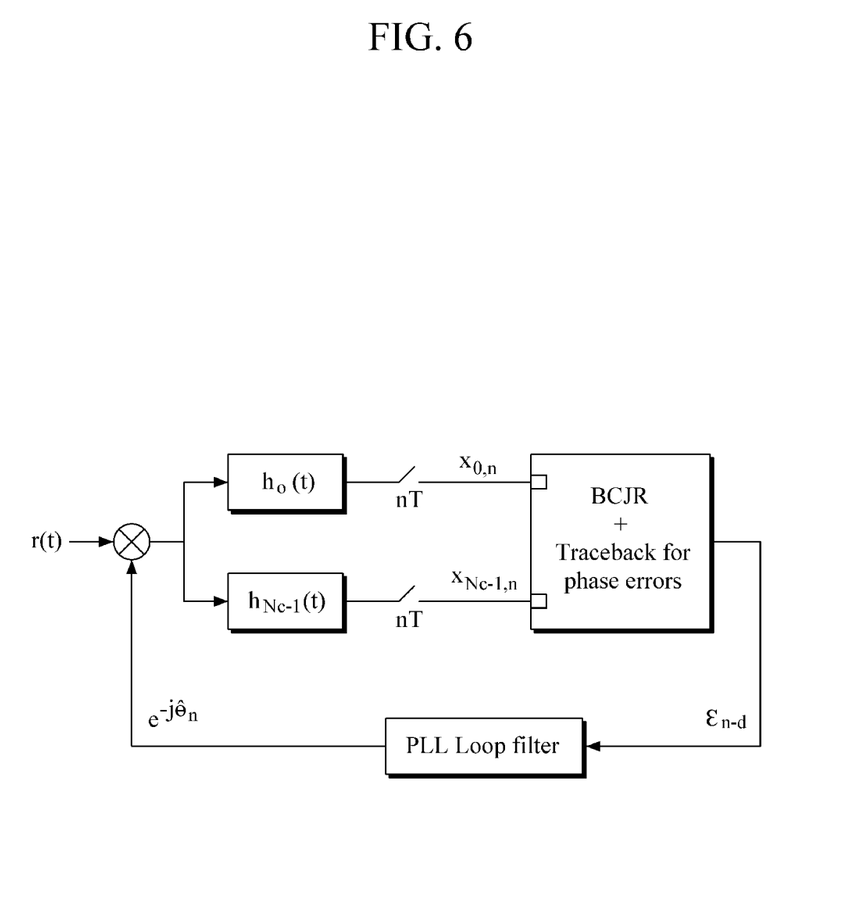
FIG. 6 is a diagram illustrating synchronization process according to another exemplary embodiment of the present invention.

FIG. 4 is a diagram illustrating a communication apparatus for a continuous phase modulation signal according to another exemplary embodiment of the present invention. FIG. 5 is a diagram illustrating synchronization process according to an exemplary embodiment of the present invention. FIG. 6 is a diagram illustrating synchronization process according to another exemplary embodiment of the present invention. Examples illustrated in FIGS. 4 to 6 may be applied to a receiving or demodulation part of a communication system.

Referring to FIG. 4, communication apparatus 400 may include a sample storage unit 401, a first synchronizing unit 402, and a second synchronizing unit 403.

The sample storage unit 401 may store received data samples. For example, the sample storage unit 401 may store a data sequence with the structure of the burst as shown in FIG. 3. In other words, the sample storage unit 401 may operate as a window of a receiving apparatus.

In response to inputting a data sample to the sample storage unit 401, IsBurstReady signal is activated, allowing the first synchronizing unit 402 to detect a burst start timing and compensate for a symbol timing error and a carrier frequency error. For example, the first synchronizing unit 402 may detect a burst start timing from a window having a length of 2*(Half Guard Time)*(number of oversamplings), wherein a position at which a maximum correlation value occurs may be determined as a start timing of the burst. The symbol timing error may be compensated for by moving a window of each sample data sequence back and forth prior to recording a correlator output. In addition, a timing error occurring between digital sample sequences may be compensated for by obtaining a symbol timing error estimation value via a fractional delay part corresponding to a decimal part (rational numbers between 0 and 1) and updating an output of an interpolator according to a quadratic operation on the obtained symbol timing error estimation value and a predefined interpolation filter coefficient.

The second synchronizing unit 403 may perform symbol detection and phase synchronization using a BCJR algorithm. For example, a bit log likelihood ratio (LLR) value is input to a soft-decision decoder, and recursively updated LLR values are input to the soft-decision decoder. Thus, phase tracking and channel decoding can be recursively performed.

In one example, the first synchronizing unit 402 may simultaneously perform detection of burst start point, symbol timing synchronization, and carrier frequency synchronization using a predefined two-dimensional cell data.

Referring to FIG. 5, iCorr 501 as two-dimensional cell data may have columns and rows. In this case, column information of the iCorr 501 may correspond to a partial correlation value in association with a received data sample, and row information may correspond to a result of fast Fourier transform (FFT) of the correlation value. The first synchronizing unit 402 may calculate an error of the carrier frequency using a position at which a result of squaring an I/Q vector in a frequency domain of the generated iCorr 501 is maximized. Further, the burst start point and the symbol timing error may be calculated using a position at which a result of squaring an I/Q vector in a time domain of the generated iCorr 501 is maximized.

More specifically, when an input data sample is input to TwisterCorr.FIFO, and a certain section of data is input, FFT-based symbol timing error/burst start point/carrier frequency error synchronization may be performed as below.

By use of a previously input data sample sequence, cross-correlation of known UW (section 1) and 0 data UW (section q) is performed. In this case, correlation values obtained for a time of (2*HGT (Half Guard Time)+2)*OSF (Over Sample Factor) may be written in memory in a column-wise form. In addition, the correlation values written in each column may be converted into vector values in a frequency domain which are obtained by 512 FFT, and the vector values are written in a row-wise form. Based on a position of maximum peak data obtained around a maximum value acquired from the time domain, fraction delay value u is obtained, and this value is input to the interpolator as a fraction part to correct a sampling point.

In another example, the second synchronizing unit may estimate an initial phase using a preamble and a midamble of a data sample based on BJCR algorithm.

Referring to FIG. 6, a received signal r(t) may be represented by Equation 9 as below.

$$r(t) = s(t,\alpha)e^{j\theta(t)} + w(t) \qquad (9)$$

where w(t) represents Gaussian noise. The configuration illustrated in FIG. 6 may perform an algorithm to maximize Equation 10 as below.

$$L(\tilde{\alpha}, \tilde{\theta}) = -\int_{-\infty}^{+\infty} |r(t) - s(t, \tilde{\alpha})e^{j\tilde{\theta}(t)}|^2 dt \qquad (10)$$

Since continuous phase modulation has a fixed envelope, process for maximizing Equation 10 is the same as the process for correlating a transmission signal and a receiving signal. This may be represented by Equation 11 as below.

$$\lambda(\tilde{\alpha}, \tilde{\theta}) = \mathrm{Re}\left\{\int_{-\infty}^{+\infty} r(t)s(t, \tilde{\alpha})^* e^{j\tilde{\theta}(t)} dt\right\} \qquad (11)$$

In addition, Equation 11 can be derived into Equation 13 using Equation 12 as below.

$$s(t, \tilde{\alpha}) \cong \sum_{k=0}^{N_c-1} \sum_n \tilde{\alpha}_{k,n} h_k(t - nT) \qquad (12)$$

$$\lambda(\tilde{\alpha}, \tilde{\theta}) \cong \mathrm{Re}\left\{\sum_n \sum_{k=0}^{N_c-1} \tilde{\alpha}_{k,n}^* e^{-j\tilde{\theta}(nT)} \underbrace{\int_{-\infty}^{+\infty} r(t)h_k(t - nT) dt}_{r_{k,n}:\text{output of the k-th componenet matched filer}}\right\}$$

$$\lambda(\tilde{\alpha}, \tilde{\theta}) \cong \mathrm{Re}\left\{\sum_n \sum_{k=0}^{N_c-1} \tilde{\alpha}_{k,n}^* e^{-j\tilde{\theta}(nT)} r_{K,n}\right\} = \qquad (13)$$

$$\sum_n \underbrace{\mathrm{Re}\left\{e^{-j\tilde{\theta}(nT)}\left(\sum_{k=0}^{N_c-1} r_{k,n}\tilde{\alpha}_{k,n}^*\right)\right\}}_{\lambda_m(\tilde{\alpha},\tilde{\theta}(mT))}$$

The phase tracking may be performed as follow. First, using a preamble and a midamble of a burst structure as illustrated in FIG. 3, an initial phase $\hat{\theta}_o$ is estimated. In other words, $(\hat{\alpha}_{k,n})_k$ that maximizes $$\sum_{m \le n} \lambda_m(\tilde{\alpha}, \tilde{\theta}_0)$$

may be obtained and then $\hat{\theta}_n$ may be updated. In this course, process as represented by Equation 14 as below may be recursively performed.

$$\varepsilon_n = \mathrm{Im}\left\{\sum_{k=0}^{N_c-1} \frac{e^{-j\hat{\theta}_n} r_{k,n} \hat{\alpha}_{k,n}^*}{x_{k,n}}\right\} \hat{\theta}_{n+1} = \hat{\theta}_n + y\xi_{n-d} \text{ and} \qquad (14)$$

$$\xi_{n+1} = \xi_n + (1+\alpha)\varepsilon_n - \varepsilon_{n-1}$$

Figure 7:
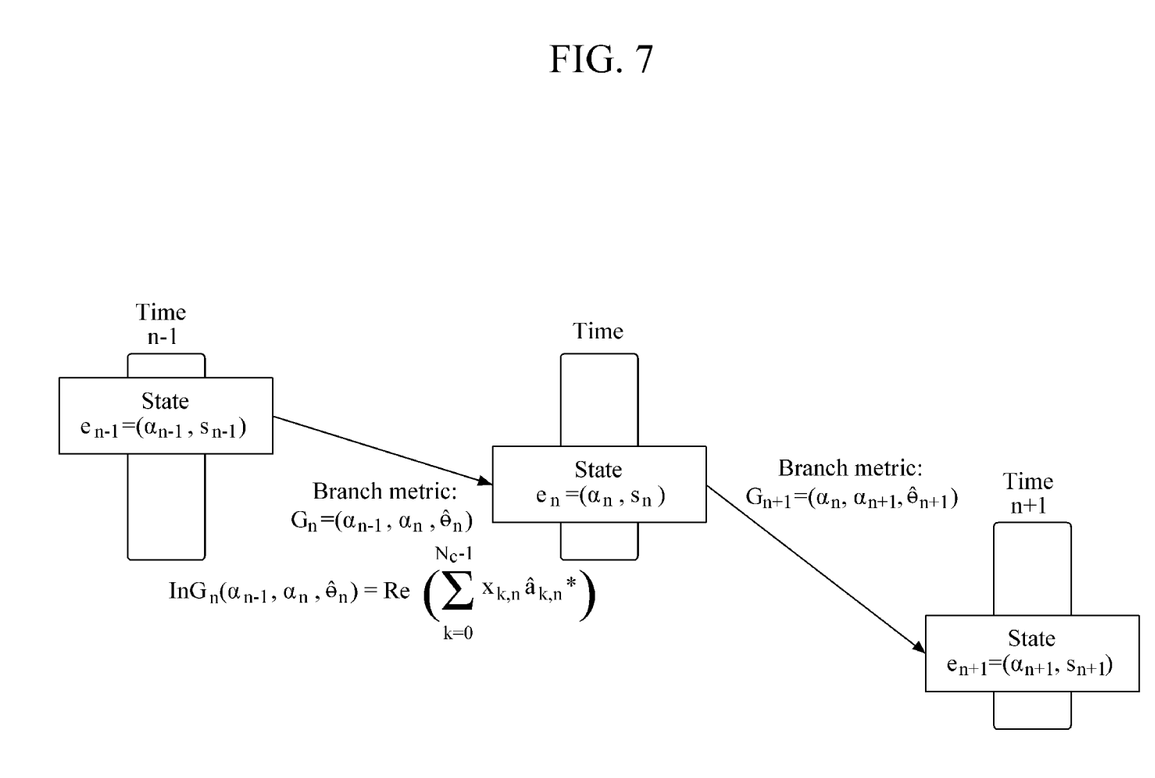
FIG. 7 is a schematic diagram illustrating simplified trellis according to an exemplary embodiment of the present invention.

FIG. 7 is a schematic diagram illustrating simplified trellis according to an exemplary embodiment of the present invention.

Referring to FIG. 7, in trellis detection, forward and backward recursions may be represented by Equation 15 as below.

$$\mu_f(e_n, \hat{\theta}_n) = \sum_{\varepsilon_{n-1} \in N^-(e_n)} \mu_f(e_{n-1}, \hat{\theta}_{n-1}) G_n(\alpha_{n-1}, \alpha_n, \hat{\theta}_n) \underbrace{P(\alpha_n)}_{\substack{a\ priori\\ probability}} \qquad (15)$$

$$\mu_o(e_n, \hat{\theta}_n) = \sum_{\varepsilon_{n+1} \in N^+(e_n)} \mu_o(e_{n+1}, \hat{\theta}_{n+1}) G_{n+1}(\alpha_n, \alpha_{n+1}, \hat{\theta}_{n+1}) \underbrace{P(\alpha_{n+1})}_{\substack{a\ priori\\ probability}}$$

In this case, an extrinsic probability may be calculated by Equation 16 as below.

$$P_\varepsilon(\alpha_n, \hat{\theta}_n) = \frac{p(\alpha_n | r)}{p(\alpha_n)} = \sum_{s_n} \mu_f\left(\frac{(\alpha_n, s_n)}{\varepsilon_n}, \hat{\theta}_n\right)\mu_o\left(\frac{(\alpha_n, s_n)}{\varepsilon_n}, \hat{\theta}_n\right), \qquad (16)$$

where Gn denotes branch metric. While the forward recursion is proceeding, a phase error is estimated, and a phase is corrected during the backward recursion.

As described above, the transmission and reception configuration according to the exemplary embodiments herein is operable regardless of relevant channel codes, reduces complexity (the amount of computation), and minimizes degradation of receiving performance. Further, according to the exemplary embodiments herein, unique word detection, frequency synchronization, and phase synchronization can be simultaneously performed by one-time operation, and symbol correction and a matched filter can be concurrently performed so as to enhance the mismatch of the matched filter under a severe jitter condition.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus for a continuous phase modulation signal, comprising:
    a first processing unit configured to generate first information of the continuous phase modulation signal using first symbol data;
    a symbol converting unit configured to convert the first symbol data into second symbol data or convert the second symbol data into the first symbol data;
    a symbol storage unit configured to store the second symbol data;
    a second processing unit configured to generate second information of the continuous phase modulation signal using the second symbol data stored in the symbol storage unit;
    a third processing unit configured to generate third information of the continuous phase modulation signal using the second information and a modulo operation of an integer related to a modulation index; and
    an output unit configured to add an output from the third processing unit and an output is from the first processing unit and generate the continuous phase modulation signal.

2. The communication apparatus of claim 1, wherein the first processing unit is further configured to convolute the first symbol data and a phase pulse to generate the first information.

3. The communication apparatus of claim 1, wherein the second processing unit is further configured to generate the second information using pieces of the second symbol data stored in the symbol storage unit other than the latest L pieces of second symbol data.

4. The communication apparatus of claim 1, wherein the third processing unit is further configured to operate at a symbol rate that is a positive integer.

5. The communication apparatus of claim 1, wherein the third processing unit is further configured to be connected to an end of the second processing unit.

6. The communication apparatus of claim 1, wherein the second symbol data is unsigned integer type data.

7. The communication apparatus of claim 1, wherein the first information corresponds to a correlative state of the continuous phase modulation signal, the second information corresponds to a phase state of the continuous phase modulation signal, and the third information corresponds to a phase tilt or phase offset of the continuous phase modulation signal.

8. The communication apparatus of claim 1, further comprising:
    a trellis termination unit configured to generate a trellis termination symbol using a modulo operation with respect to an interim calculation result of the second processing unit.

9. The communication apparatus of claim 8, wherein the trellis termination unit is further configured to comprise
    an adder configured to add an output from the symbol storage unit and the interim calculation result of the second processing unit, and
    a modulo operator configured to perform a modulo operation on an output from the adder.

10. The communication apparatus of claim 1, wherein a burst structure of the continuous phase modulation signal consists of a preamble, a first data symbol, a midamble, and a second data symbol.

11. The communication apparatus of claim 10, wherein a trellis termination symbol is inserted between the first data symbol and the midamble, or at an end of the second data symbol.

* * * * *